United States Patent [19]

Hashimoto

[11] Patent Number: 5,151,921
[45] Date of Patent: Sep. 29, 1992

[54] SPREAD SPECTRUM COMMUNICATION DEVICE

[75] Inventor: Takeshi Hashimoto, Tokyo, Japan

[73] Assignee: Clarion Co., Ltd., Tokyo, Japan

[21] Appl. No.: 748,941

[22] Filed: Aug. 23, 1991

[30] Foreign Application Priority Data

Aug. 28, 1990 [JP] Japan .................. 2-227537

[51] Int. Cl.⁵ .......................... H04L 27/30
[52] U.S. Cl. ........................ 375/1
[58] Field of Search ........................ 375/1

[56] References Cited

U.S. PATENT DOCUMENTS

| 4,122,393 | 10/1978 | Gordy et al. | 375/1 |
|---|---|---|---|
| 4,392,220 | 7/1983 | Hirosaki et al. | 375/1 |
| 4,761,796 | 8/1988 | Dunn et al. | 375/1 |
| 4,912,722 | 3/1990 | Carlin | 375/1 |
| 4,914,699 | 4/1990 | Dunn et al. | 375/1 |
| 4,926,440 | 5/1990 | Mikoshiba et al. | 375/1 |
| 4,941,150 | 7/1990 | Iwasaki | 375/1 |
| 4,943,975 | 7/1990 | Kurihara et al. | 375/1 |
| 5,025,452 | 6/1991 | Sohner et al. | 375/1 |
| 5,046,066 | 9/1991 | Messenger | 370/94.1 |
| 5,048,052 | 9/1991 | Hamatsu et al. | 375/1 |
| 5,062,121 | 10/1991 | Kurihara et al. | 375/1 |
| 5,063,560 | 11/1991 | Yerbury et al. | 375/1 |
| 5,081,644 | 11/1992 | Uchida et al. | 375/1 |
| 5,105,294 | 4/1992 | Degura et al. | 375/1 |

Primary Examiner—Salvatore Cangialosi
Attorney, Agent, or Firm—Flynn, Thiel, Boutell & Tanis

[57] ABSTRACT

A spread spectrum communication device is disclosed, which can reproduce data by means of one convolver by using the upper band component and the lower band component of the spectre spectrum (SS) signal and the upper band component and the lower band component of the spectre of a correlation output.

6 Claims, 12 Drawing Sheets

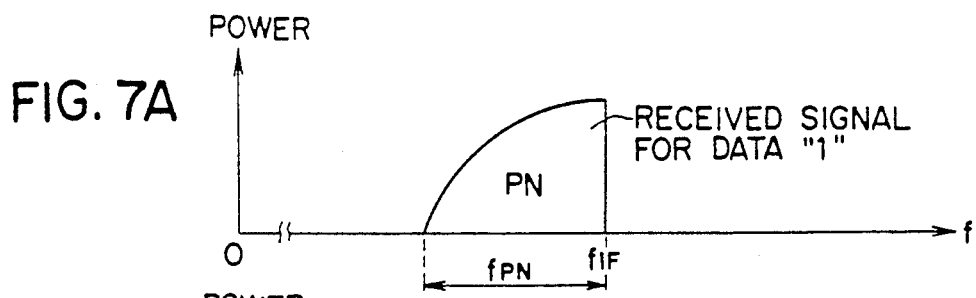
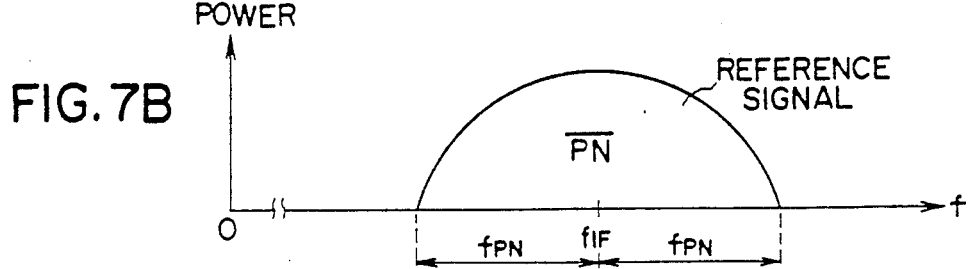
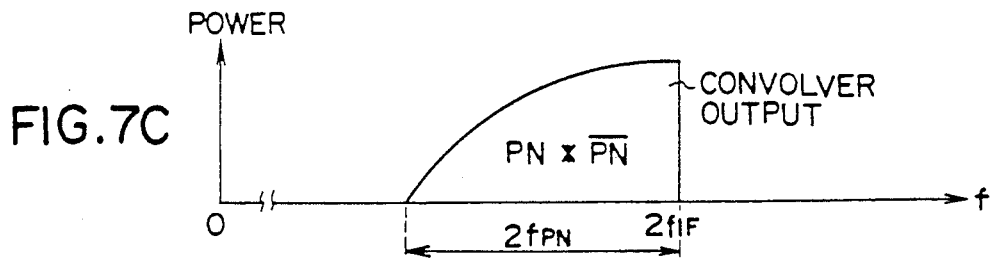
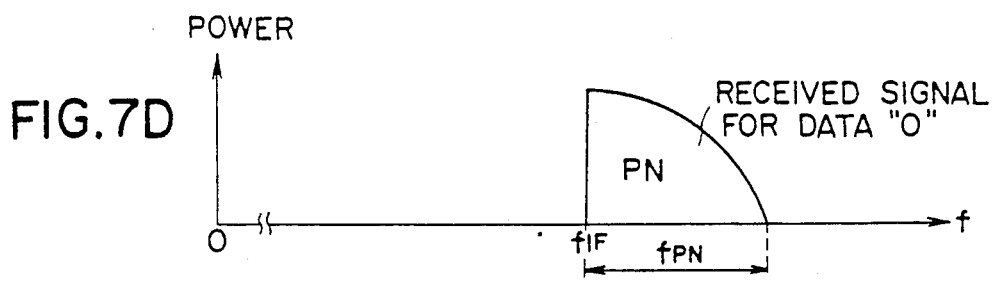
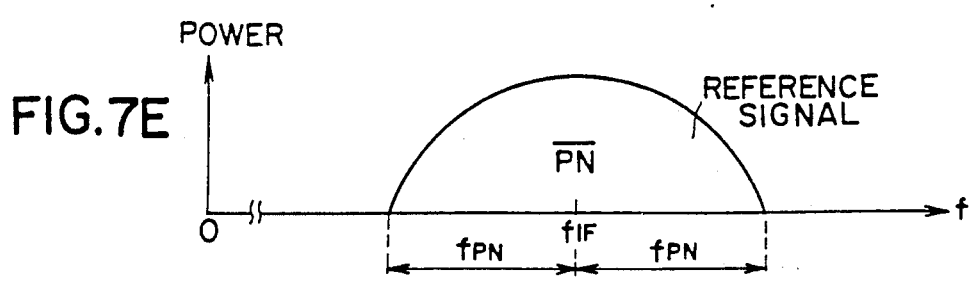
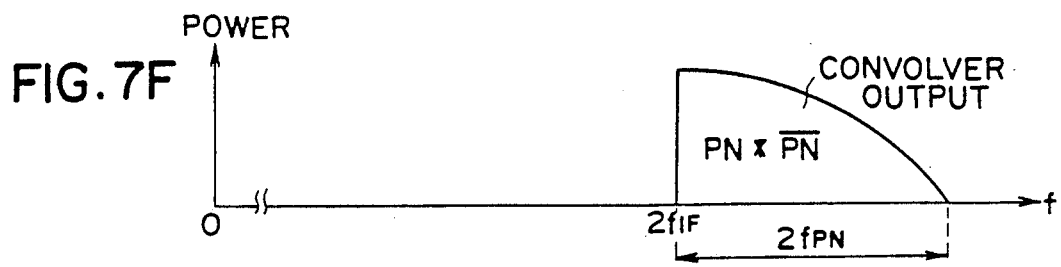

SPREAD SPECTRUM COMMUNICATION DEVICE

FIELD OF THE INVENTION

The present invention relates to a spread spectrum communication device and in particular to an improvement for reducing influences of interference wave.

BACKGROUND OF THE INVENTION

Various sorts of systems have been researched and developed up to now for communication systems. As one of these systems there is known the spread spectrum communication system (hereinbelow abbreviated to SS communication system).

By this SS communication system, signals such as data, sound, etc. of narrow frequency band are spectrum-spread into a wide frequency band on the transmitter side by using a pseudo noise code (hereinbelow abbreviated to PN code) to be transmitted and on the receiver side the wide frequency band signals thus obtained are inversely spread into the initial narrow frequency band signals by means of a correlator to be reproduced.

It is known that this SS communication system is resistant to external interference, noise, etc. (these are called interference wave) and that it has an interference excluding power corresponding to a process gain (PG). The process gain used here is given by a following formula;

$$PG = \frac{\text{radio frequency bandwidth}}{\text{information speed}}$$

where the radio frequency bandwidth is the bandwidth of the transmitted spread spectrum signal and the information speed is the data speed at the base band.

As an SS communication device (hereinbelow called simply communication device using such an SS communication system resistant to interference wave there is known e.g. that described in FIG. 7 in U.S. patent application Ser. No. 475,185, (now U.S. Pat. No. 5,048,052.

If interference wave exists in the frequency band of the SS signal in the signal received by a receiver constructed as described above, since spurious noise is superposed on correlation spikes in the output of he correlator (output of the SAW convolver), variations are produced in the correlation spikes and the spurious noise. Here a result of a convolution integration of an SS signal in the received signal and an SS signal of a time-inverted reference signal, as indicated in FIG. 14, is called correlation peak and a result of a convolution integration of interference wave in the received signal and an SS signal of the reference signal is called spurious noise.

In such a state, by the prior art system described above, since only two comparators are used only for shaping the waveform, it is not possible to detect the level of the correlation peak and the level of the spurious noise and the threshold setting level for separating the correlation peak from the spurious noise becomes undetermined, which gives rise to erroneous judgment, as indicated in FIG. 15.

As described above, by the system using two comparators, due to the fact that it is not possible to detect the level of he correlation peak and the level of the spurious noise, worsening in the power of excluding interference wave expressed by the process gain takes place.

As an SS communication receiving device taking such a problematical point into account, another prior art system is disclosed in U.S. patent application Ser. No. 725,530. By this system according to the older application it is intended to improve the data reproducing power by reproducing data, while comparing the correlation peak level obtained by peak-holding and integrating the correlation output with the spurious noise level.

However, even by the system according to the older application, it is necessary to use two convolvers serving as correlators and therefore there is yet room for improvement in the cost and the size reduction.

OBJECT OF THE INVENTION

Therefore the object of the present invention is to provide an SS communication device capable of reducing erroneous judgment due to influences of interference wave and improving communication quality, in which only one correlator is used.

SUMMARY OF THE INVENTION

In order to achieve the above object, a spread spectrum communication device according to a first invention of the present application is characterized in that it consists of a transmitter comprising first modulating means for modulating a predetermined carrier wave with a first PN code outputted by a first PN code generator; switching means for separating modulated signals obtained by the modulating means into two parts, responding to information data; a first filter, which makes the lower band of one of the modulated signals separated by the switching means pass through; a second filter, which makes the upper band of the other of the modulated signals separated by the switching means pass through; and synthesizing means for combining outputs of the first and the second filter; and a receiver comprising a second PN code generator for generating a second PN code, which is inverted in time with respect to the first PN code in the transmitter; second converting means for converting the second PN code outputted by the second PN code generator in frequency by using a predetermined carrier signal; correlating means for correlating a received signal with the output of the second modulating means; a third filter, which makes the lower band component of the spectre outputted by the correlation means pass through; a fourth filter, which makes the upper band component of the spectre outputted by the correlation means pass through; and data comparing means, which reproduces the data, while comparing the output level of the third filter with the output level of the fourth filter.

A spread spectrum communication system according to a second invention of the present application is characterized in that it consists of a transmitter comprising a first PN code generator for outputting selectively a first PN code and a second PN code according to information data; and first modulating means for modulating a predetermined carrier with the output of the first PN code generator; and a receiver comprising second modulating means and third modulating means, which modulate a predetermined carrier with a third PN code obtained by inverting the first PN code in time and a fourth PN code obtained by inverting the second PN code in time, respectively; a first filter, which makes the lower band component of the spectre outputted by the correlating means pass through; a second filter, which makes the upper band component of the spectre outputted by the third modulating means pass through; synthesizing means for combining outputs of the first and the second filter; correlating means for correlating a received signal with the output of the synthesizing means; a third filter, which makes the lower band component of the spectre outputted by the correlating means pass through; a fourth filter, which makes the upper band component of the spectre outputted by the correlating means pass through; and data comparing means, which reproduces the data, while comparing the output level of the third filter with the output level of the fourth filter.

Since data reproduction is effected by utilizing the upper band component and the lower band component of the spectre of an SS signal by means of the construction as described above, it is possible to reproduce data with a high efficiency by means of one correlator.

BRIEF DESCRIPTION OF THE DRAWINGS

FIGS. 3, 4, 5A, 5B, 6A, 6B, 7A to 7F, 8A, 8B, 9A and 9B are schemes for explaining the operation of the embodiment described above;

DETAILED DESCRIPTION

Figure 1:
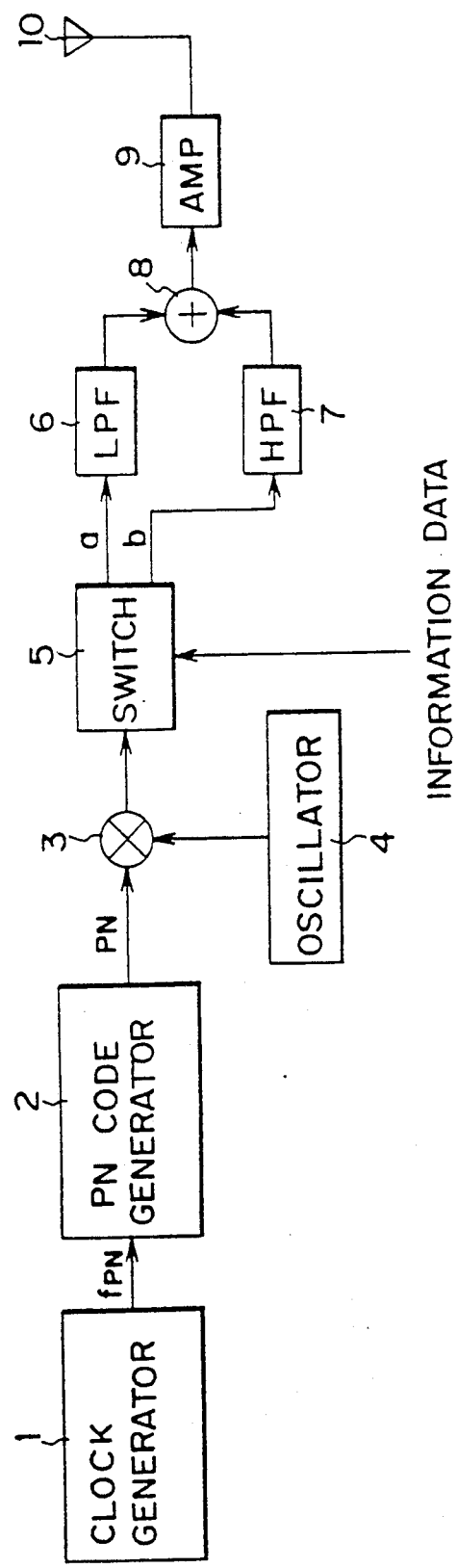
FIG. 1 is a block diagram indicating the construction of the transmitter according to an embodiment of the present invention.
Figure 2:
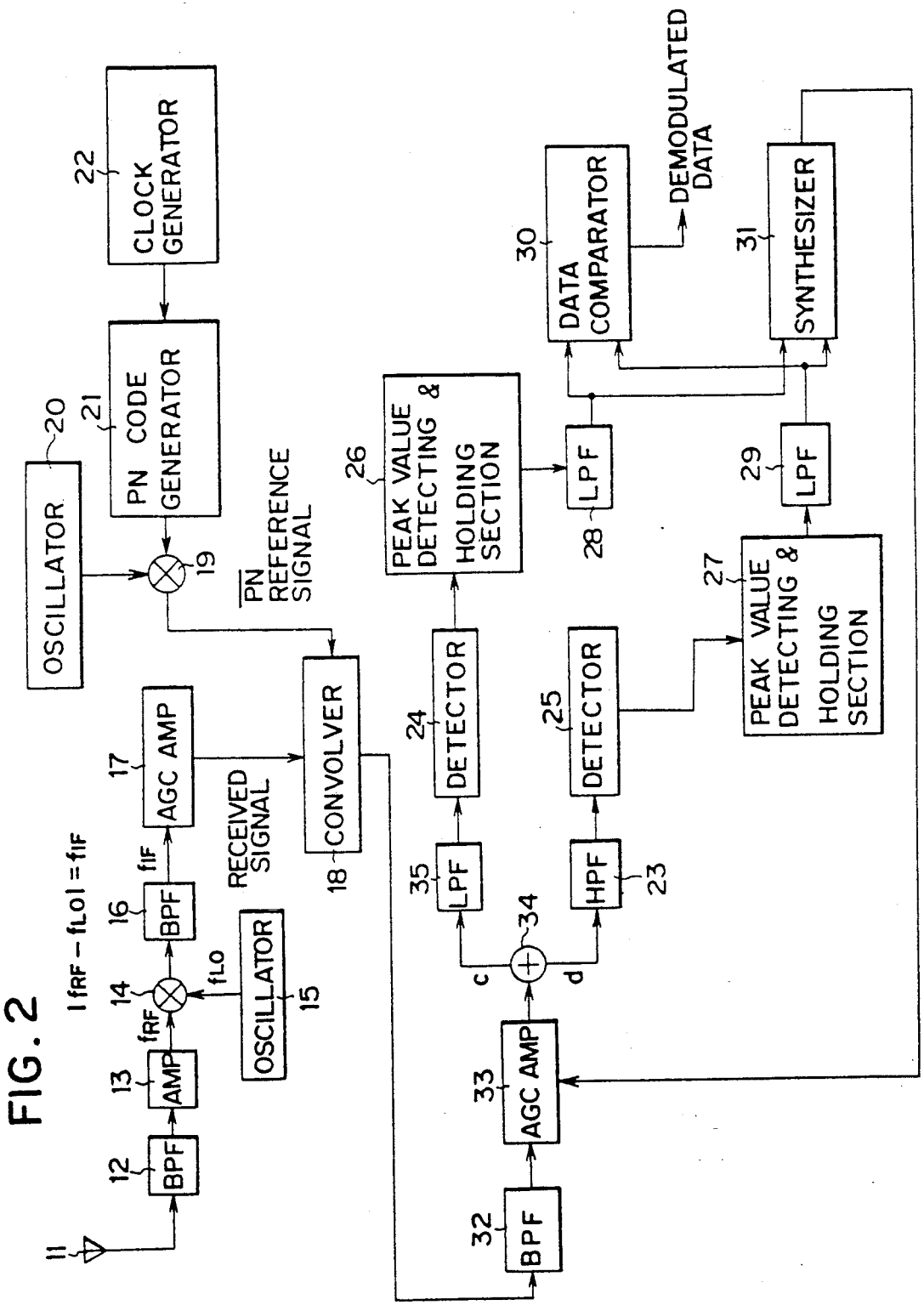
FIG. 2 is a block diagram indicating the construction of the receiver according to the embodiment of the present invention.

Hereinbelow the present invention will be explained, referring to the embodiments indicated in the drawings. FIGS. 1 and 2 show an embodiment of the transmitter and the receiver, respectively, of a spread spectrum communication device according to the present invention.

In the transmitter indicated in FIG. 1, reference numeral 1 is a clock generator; 2 is a PN code generator; 3 is a modulator; 4 is a carrier oscillator; 5 is a switch for separating modulated signals from the modulator 3, responding to information data; 6 is a low pass filter (LPF); 7 is a high pass filter (HPF); 8 is a synthesizer; 9 is an amplifier; and 10 is a transmitting antenna.

In the receiver indicated in FIG. 2, reference numeral 11 is a receiving antenna; 12 is a band pass filter (BPF); 13 is an amplifier; 14 is a mixer; 15 is a local oscillator; 16 is a band pass filter; 17 is an AGC amplifier; 18 is a convolver; 19 is a modulator; 20 is a carrier oscillator; 21 is a PN code generator; 22 is a clock oscillator; 23 is a high pass filter; 24 and 25 are detectors; 26 and 27 are peak value detecting and holding sections; 28 and 29 are low pass filters; 30 is a data comparator; 31 is a synthesizer; 32 is a band pass filter; 33 is an AGC amplifier; 34 is a distributor; and 35 is a low pass filter.

Figure 3:
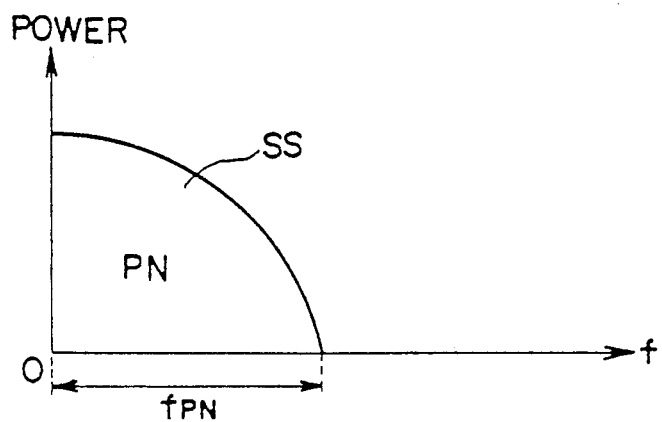

In the transmitter indicated in FIG. 1 the PN code generator 2 is started by a PN clock ($f_{PN}$) outputted by the clock generator 1 to output an SS signal (PN) having a spectre having a bandwidth $f_{PN}$ as indicated in FIG. 3.

Figure 4:
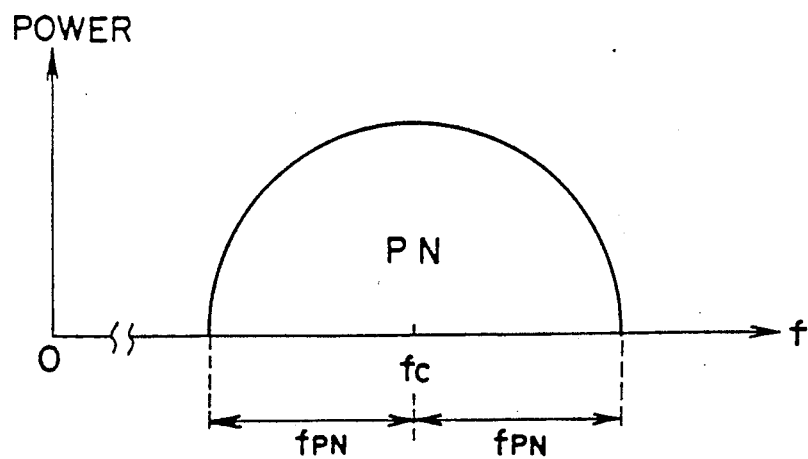

The modulator 3 RF-modulates an RF carrier signal ($f_c$) from the oscillator 4 with the output of the PN code generator 2, as indicated in FIG. 4.

The switch 5 selects one of a and b, responding to information data. For example, here, it is supposed that a is selected for data "1", while b is selected for data "0".

Figure 5A:
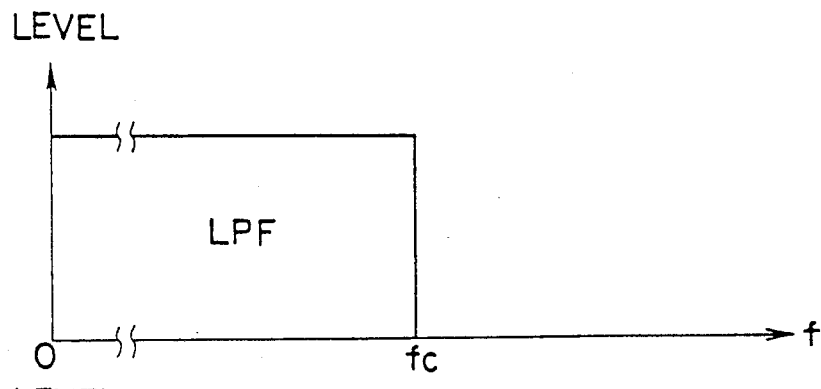
Figure 5B:
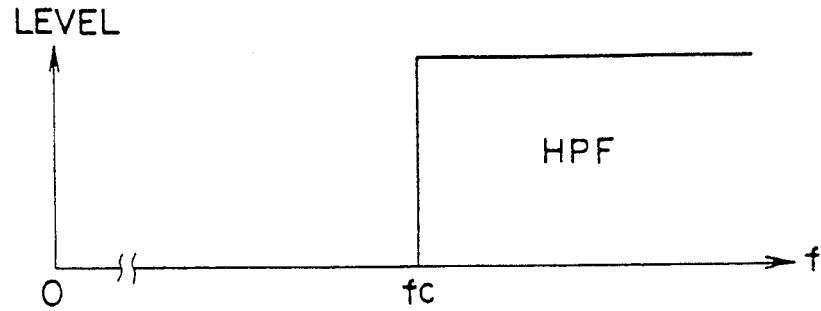
Figure 6A:
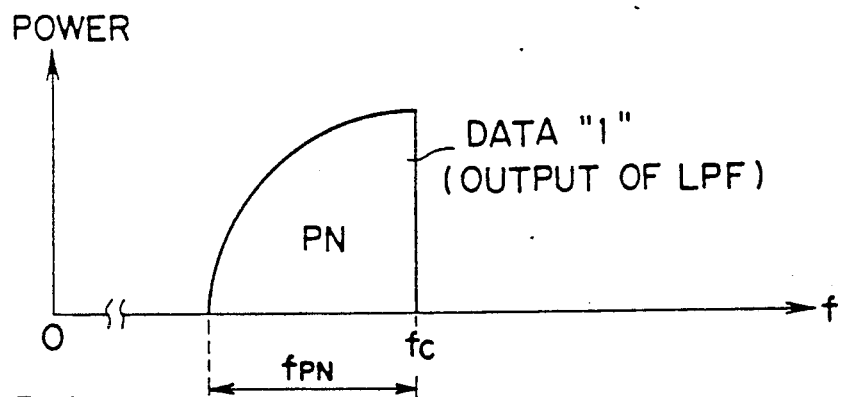
Figure 6B:
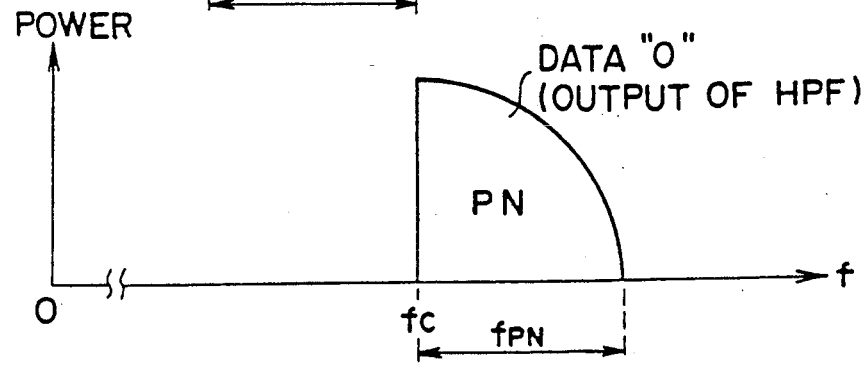

The LPF (low pass filter) 6 and the HPF (high pass filter) 7 are filters having pass characteristics indicated in FIGS. 5A and 5B, respectively, with respect to $f_c$. The LPF 6 makes the lower band component of the spectre of the SS signal pass through, while the HPF 7 makes the upper band component of the spectre pass through. Here, since a and b are switched over, the lower band component of the spectre of the SS signal is outputted by the LPF 6 for data "1" and the upper band component of the spectre of the SS signal is outputted by the HPF 7 for data "0", as indicated in FIGS. 6A and 6B, respectively.

The synthesizer 8 combines the outputs of the LPF 6 and the HPF 7 to synthesize an output and the amplifier 9 amplifies the output of the synthesizer 8 up to a suitable level to transmit it through the antenna 10.

Now the operation of the receiver indicated in FIG. 2 will be explained.

The SS signal received by the antenna 11 is multiplied by a local carrier signal (($f_{LO}$) outputted by the local oscillator 15 in the mixer 14 after having passed through the band pass filter 12 and the amplifier 13, to be frequency-converted into an intermediate frequency, whose central frequency is $f_{IF}$. Usually $f_{IF}$ is so selected that it is at the central frequency of the band of the convolver. The output thereof (received signal) is inputted in one input port of the convolver 18 after having passed through the BPF 16 and the AGC amplifier 17.

An SS signal (reference signal) obtained by multiplying the output of the PN code generator 21 generating a PN code (PN), which is inverted in time with respect to the PN code on the transmitter side, by the IF carrier signal ($f_{IF}$) from the oscillator 20 in the mixer and by frequency-converting the result thus obtained into an intermediate frequency, whose central frequency is $f_{IF}$, is inputted in the other input port of the convolver 18.

In the convolver 18 the spectres of the received signal and the reference signal are multiplied by each other within the inverse ($1/\tau$) of the gate delay time ($\tau$) of the convolver. Consequently the output of the convolver has a central frequency of $2f_{IF}$ and a spectre (correlation output spectre) having a bandwidth of $2f_{PN}$ in the upper or the lower frequency band, depending on the data of the received signal, is produced. FIGS. 7A, 7B and 7C indicate spectres of the received signal, the reference signal and the convolver output, respectively, for data "1", while FIGS. 7D, 7E and 7F indicate spectres of the received signal, the reference signal and the convolver output, respectively, for data "0".

The BPF 32 removes unnecessary components produced by non-linearity of the convolver 18 from the correlation output. The output thereof is divided into two signals c and d by the distributer 34 after having been amplified to a suitable level by the AGC amplifier 33.

Figure 8A:
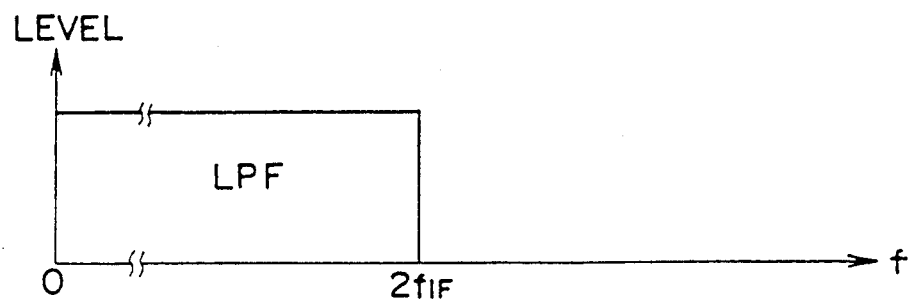
Figure 8B:
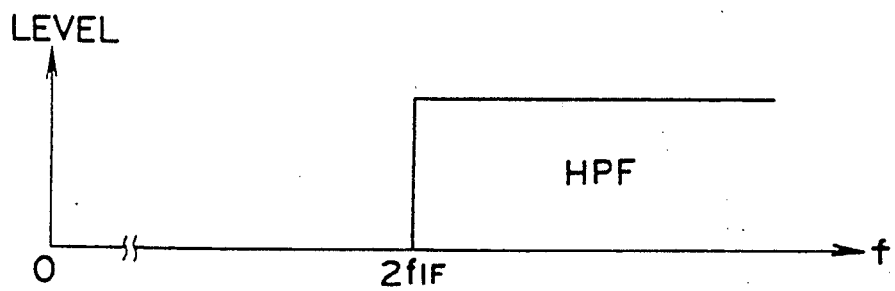
Figure 9A:
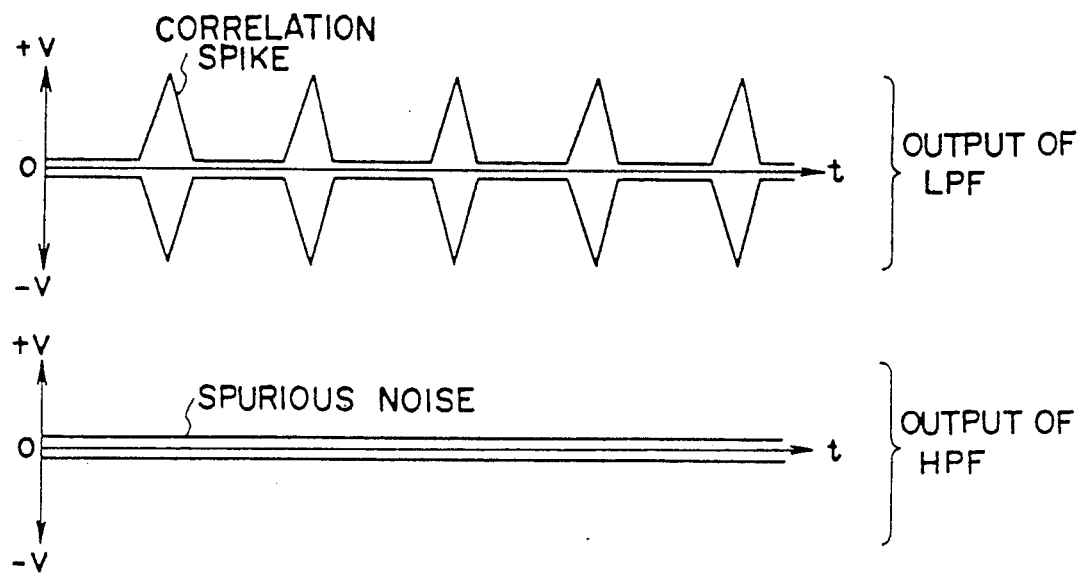
Figure 9B:
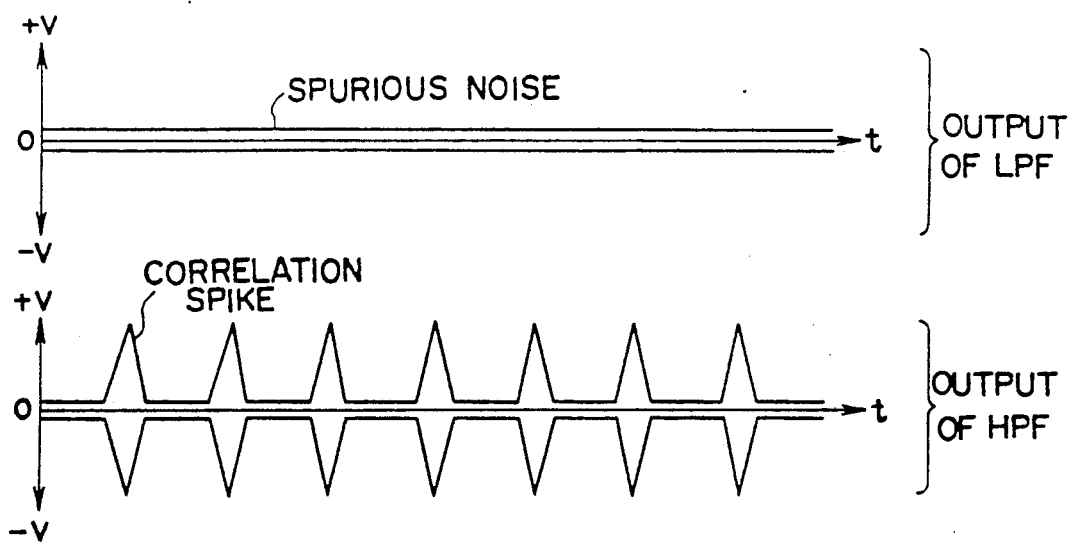

The LPF 35 and the HPF 23 are filters having pass characteristics as indicated in FIGS. 8A and 8B, respectively, with respect to $2f_{IF}$. The LPF 35 makes the lower band component of the spectre of the correlation output pass through, while the HPF 23 makes the upper band component thereof pass through. In this way, with respect to the time, for data "1", the correlation spike is obtained from the LPF output and the spurious noise is obtained from the HPF output, as indicated in FIG. 9A, and on the other hand, for data "0", the spurious noise is obtained from the LPF output and the correlation spike is obtained from the HPF output, as indicated in FIG. 9B. Here, since no mutual correlation component is contained in the spurious noise, it can be expected to improve the data reproducing property with respect to the system described in the older application (CSK system).

The construction following the detectors 24 and 25 is identical to that described in U.S. patent application Ser. No. 725,530, which is the older application described above. This construction following the detectors 24 and 25 shows only one example and any construction may be used therefor, if it reproduces the data while comparing the correlation spike level with the spurious noise level.

According to the construction in the embodiment described above, it is possible to reproduce data with a high efficiency by means of one convolver owing to the fact that, on the transmitter side, transmission is effected by utilizing the upper band and the lower band of the spectre of an SS signal by using filters and on the receiver side, the spectre of the convolver output is divided into the upper band and the lower band to separate the spurious component from the correlation spike component.

Further, although the data are reproduced by comparing the correlation spike level with the spurious noise level, here, since no mutual correlation component is included in the spurious noise, it is possible to expect to improve the data reproducing property with respect to that obtained by the system described in the older application (CSK system).

Furthermore, contrarily to the fact that two kinds of PN codes on the transmitter side and one kind of PN code on the receiver side are necessary, by the system in the embodiment described above, since one kind thereof is sufficient for each of the transmitter side and the receiver side, in the code dividing multiple communication, the number of stations of transmitters and receivers can be twice.

Figure 10:
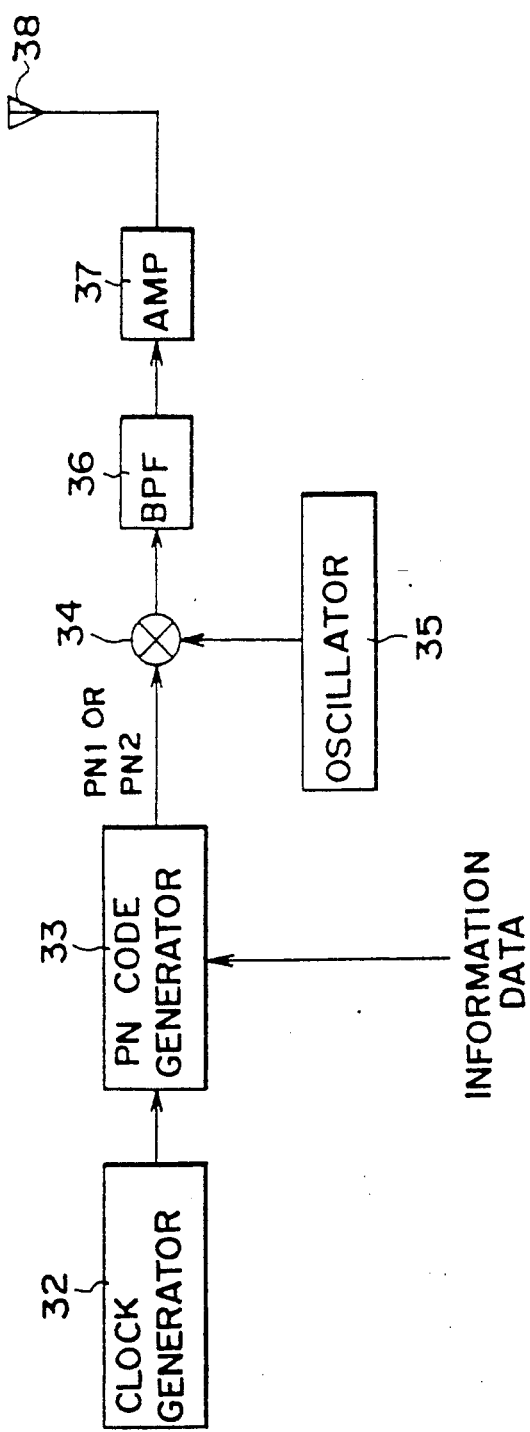
FIG. 10 is a block diagram indicating the construction of the transmitter according to another embodiment of the present invention.
Figure 11:
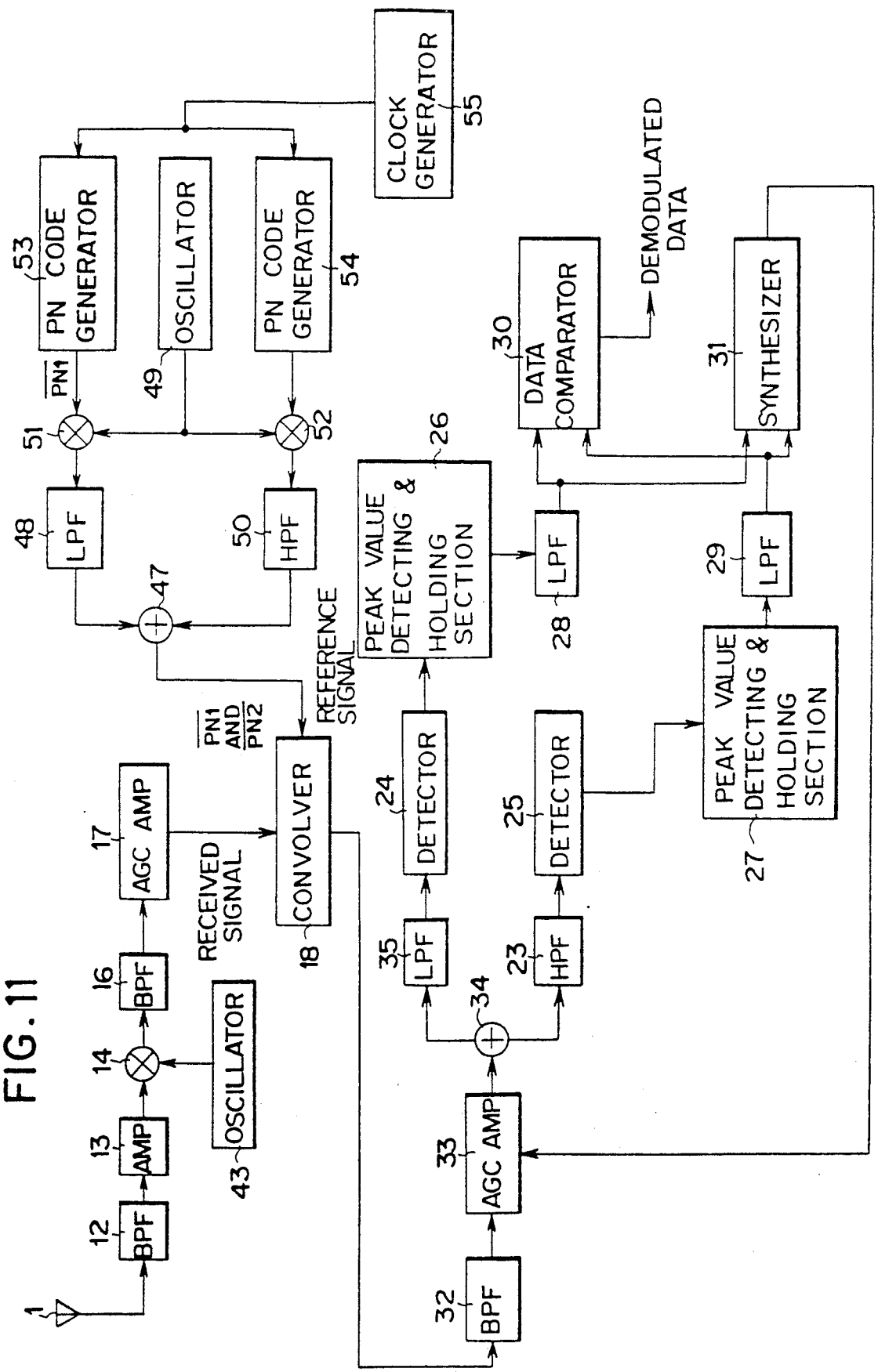
FIG. 11 is a block diagram indicating the construction of the receiver according to the other embodiment of the present invention.

FIGS. 10 and 11 indicate the construction of the transmitter and the receiver, respectively, in another embodiment of the present invention.

In the transmitter indicated in FIG. 10, reference numeral 32 is a clock generator; 33 is a PN code generator generating a PN code, PN1 or PN2, depending on information data; 34 is a modulator; 35 is a carrier oscillator; 36 is a band pass filter; 37 is an amplifier; and 38 is a transmitting antenna. This transmitter is identical to that indicated in FIG. 1 in the older application, U.S. patent application Ser. No. 475,185, which transmits signals by CSK-modulating them with a first PN code PN1 for information data "1" and a second PN code PN2 for information data "0".

In the receiver indicated in FIG. 11, the same reference numerals as those indicated in FIG. 2 represent similar circuits and what is different from the construction indicated in FIG. 2 consists in the construction of the reference signal generating section connected with the other input port of the convolver 18.

That is, the PN code generator 53 generates a PN code $\overline{(PN1)}$, which is inverted in time with respect to the first PN code PN the PN code generator 54 generates a PN code $\overline{(PN2)}$, which is inverted in time with respect to the second PN code PN2.

The mixers 51 and 52 multiply the outputs of the PN code generators 53 and 54, respectively, by the IF carrier signal ($f_{IF}$) coming from the oscillator 49 to frequency-convert them into intermediate frequencies, whose central frequency is $f_{IF}$.

Figure 12A:
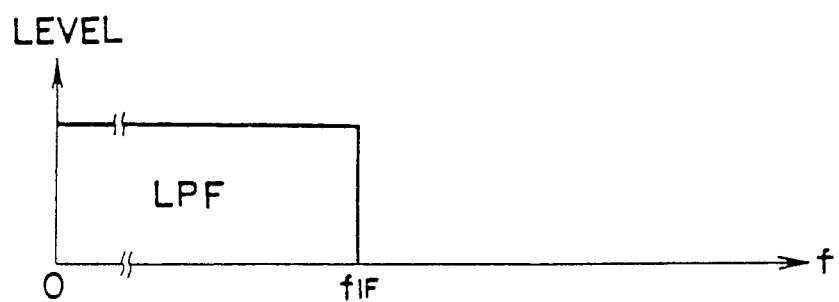
FIGS. 12A, 12B and 13A to 13F are schemes for explaining the operation of the other embodiment.
Figure 12B:
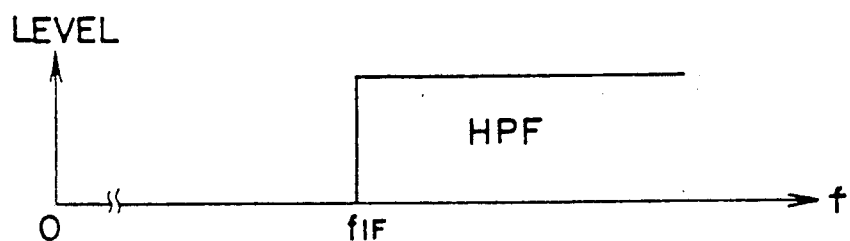

The LPF 48 and the HPF 50 are filters having pass characteristics indicated in FIGS. 12A and 12B, respectively, with respect to $f_{IF}$. The LPF 48 makes the lower band component of the spectre of the SS signal $\overline{(PN1)}$ pass through, while the HPF 50 makes the band component of the spectre of the SS signal $\overline{(PN2)}$ pass through.

The synthesizer 47 combines the SS signals, which are outputs of the LPF 48 and the HPF 50, to synthesize an output SS signal and the synthesized output is inputted in one input port of the convolver 18.

Figure 13A:
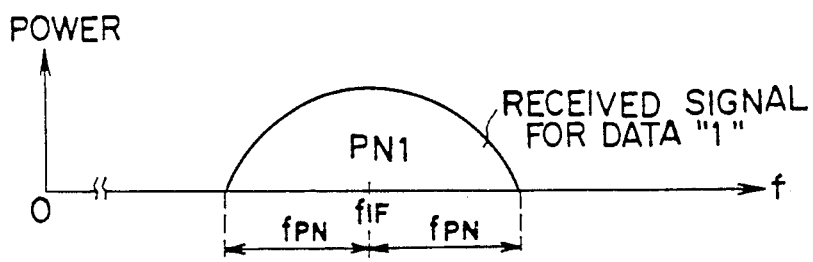
Figure 13B:
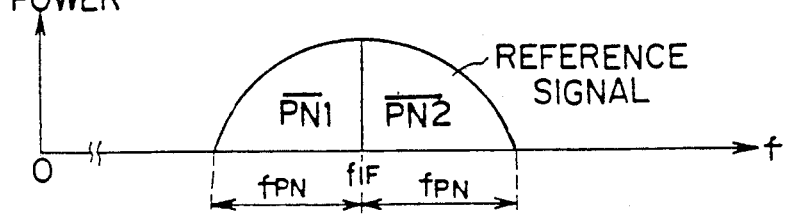
Figure 13C:
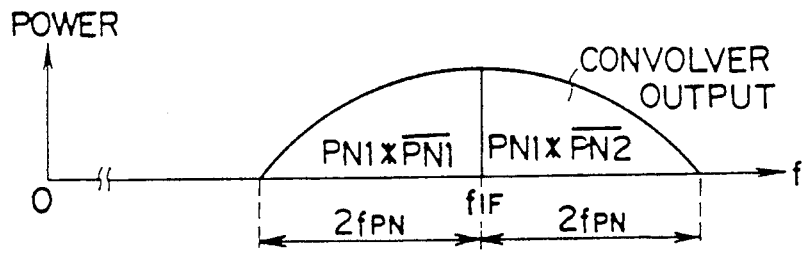
Figure 13D:
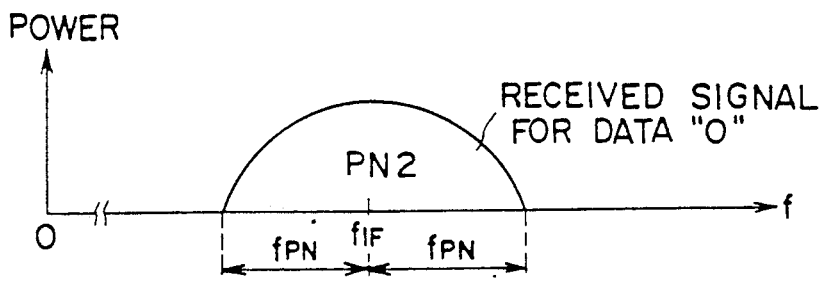
Figure 13E:
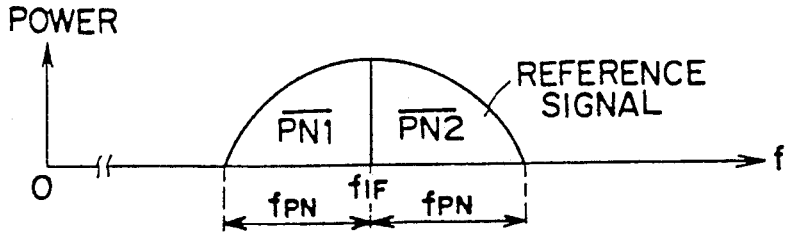
Figure 13F:
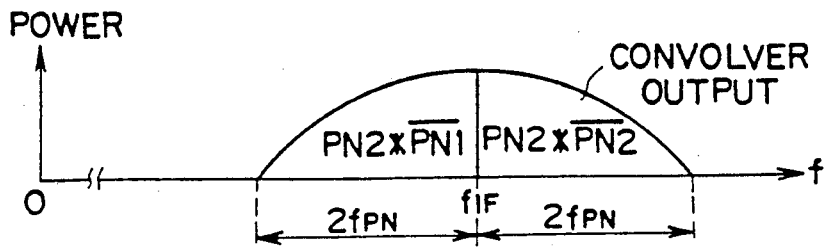
Figure 14:
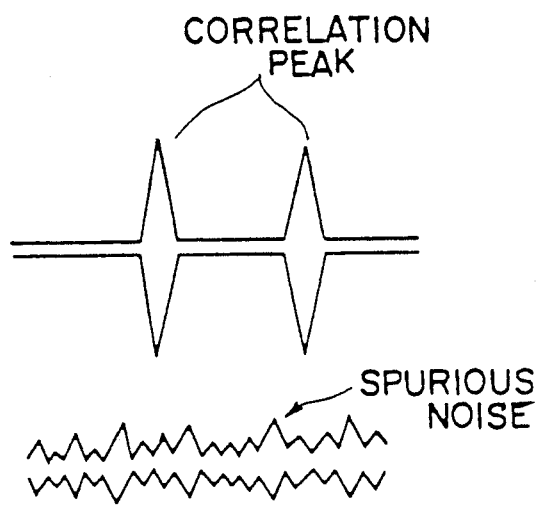
FIGS. 14 and 15 are schemes for explaining a prior art system.
Figure 15:
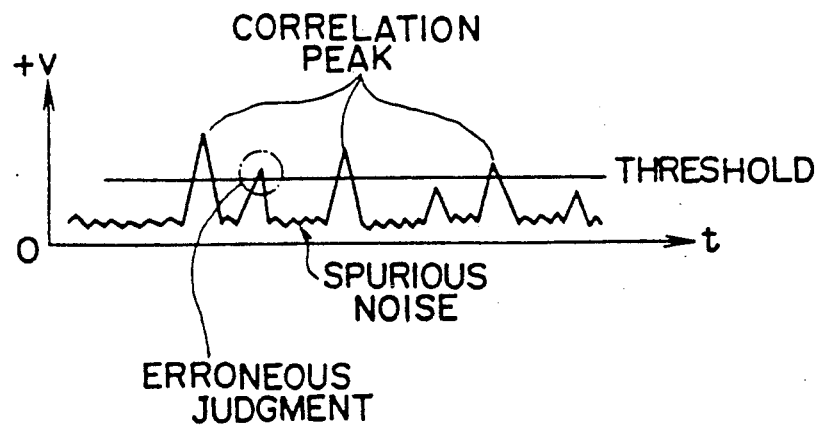

At the output of the convolver 18 a spectre (correlation output spectre) having a bandwidth of $f_{PN}$ in the upper or the lower frequency band, depending on the data of the received signal. FIGS. 13A, 13B and 13C indicate spectres of the received signal, the reference signal and the convolver output, respectively, for data "1", while FIGS. 13D, 13E and 13F indicate spectres of the received signal, the reference signal and the convolver output, respectively, for data "0".

By the embodiment described above, it is possible to reproduce data with a high efficiency by means of one convolver owing to the fact that, on the transmitter side, transmission is effected in the same way as by the system (CSK system) described in the older application and on the receiver side, the spectres having different PN codes are inputted in the convolver, separated into the upper band and the lower band by means of a filter to separate the correlation spike component and the spurious noise component by separating the correlation output spectre at the convolver output into the upper band and the lower band.

As explained above, according to the present invention, data reproduction can be effected with a high efficiency, by which influences of interference wave are reduced, by using only one convolver in an SS communication device.

What is claimed is:

1. A spread spectrum communication system, comprising:
   a transmitter which includes:
   a first PN code generator for generating a first PN code;
   first modulating means for modulating a predetermined carrier wave with said first PN code outputted by said first PN code generator;
   switching means for separating modulated signals from said first modulating means into two parts in response to information data;
   a first filter which passes the lower band of one of the two parts separated by said switching means;
   a second filter which passes the upper band of the other of the two parts separated by said switching means; and
   synthesizing means for combining outputs of said first and said second filters; and
   a receiver which includes:

a second PN code generator for generating a second PN code, which is inverted in time with respect to said first PN code in the transmitter;

second modulating means for converting the second PN code outputted by said second PN code generator in frequency by using a predetermined carrier signal;

correlating means for correlating a received signal with the output of said second modulating means;

a third filter which passes the lower band component of the spectre outputted by said correlating means;

a fourth filter which passes the upper band component of the spectre outputted by said correlating means; and data comparing means, which reproduced the information data, while comparing the output level of said third filter with the output level of said fourth filter.

2. A system as recited in claim 1, wherein said receiver includes a first detector circuit having an input coupled to an output of said third filter, a second detector circuit having an input which is coupled to an output of said fourth filter, a first peak value detecting and holding circuit having an input coupled to an output of said first detector circuit, a second peak value detecting and holding circuit having an input coupled to an output of said second detector circuit, a first low pass filter having an input coupled to an output of said first peak value detecting and holding circuit, and a second low pass filter having an input coupled to an output of said second peak value detecting and holding circuit, said data comparing means reproducing the information data by comparing outputs of said first and second low pass filters.

3. A system as recited in claim 1, including an automatic gain control amplifier having an input coupled to an output of said correlating means, said third and fourth filters each having inputs coupled to an output of said automatic gain control amplifier, and including a synthesizer circuit which is responsive to output levels of said third filter and said fourth filter for producing a control signal which is coupled to a control terminal of said automatic gain control amplifier.

4. A spread spectrum communication system, comprising:

a transmitter which includes:

a first PN code generator for selectively outputting one of a first PN code and a second PN code in response to information data; and first modulating means for modulating a predetermined carrier with the output of said first PN code generator; and a receiver which includes:

second modulating means for modulating a predetermined carrier with a third PN code which is the inverse in time of said first PN code, and third modulating means for modulating a predetermined carrier with a fourth PN code which is the inverse in time of said second PN code;

a first filter which passes the lower band component of the spectre outputted by said second modulating means;

a second filter which passes the upper band component of the spectre outputted by said third modulating means;

synthesizing means for combining outputs of said first and said second filters;

correlating means for correlating a received signal with the output of said synthesizing means;

a third filter which passes the lower band component of the spectre outputted by said correlating means;

a fourth filter which passes the upper band component of the spectre outputted by said correlating means; and data comparing means, which reproduces the information data, while comparing the output level of said third filter with the output level of said fourth filter.

5. A system as recited in claim 4, wherein said receiver includes a first detector circuit having an input coupled to an output of said third filter, a second detector circuit having an input which is coupled to an output of said fourth filter, a first peak value detecting and holding circuit having an input coupled to an output of said first detector circuit, a second peak value detecting and holding circuit having an input coupled to an output of said second detector circuit, a first low pass filter having an input coupled to an output of said first peak value detecting and holding circuit, and a second low pass filter having an input coupled to an output of said second peak value detecting and holding circuit, said data comparing means reproducing the information data by comparing outputs of said first and second low pass filters.

6. A system as recited in claim 4, including an automatic gain control amplifier having an input coupled to an output of said correlating means, said third and fourth filters each having inputs coupled to an output of said automatic gain control amplifier, and including a synthesizer circuit which is responsive to output levels of said third filter and said fourth filter for producing a control signal which is coupled to a control terminal of said automatic gain control amplifier.

* * * * *